(12) United States Patent
Shimada et al.

(10) Patent No.: US 10,124,431 B2
(45) Date of Patent: Nov. 13, 2018

(54) WIRE SAW

(75) Inventors: Hitoshi Shimada, Nanto (JP);
Tomoyuki Kawatsu, Nanto (JP);
Yosuke Yabu, Nanto (JP); Akira Tanizaki, Nanto (JP)

(73) Assignee: Komatsu NTC Ltd., Nanto, Toyama (JP)

( * ) Notice: Subject to any disclaimer, the term of this patent is extended or adjusted under 35 U.S.C. 154(b) by 485 days.

(21) Appl. No.: 14/352,958

(22) PCT Filed: Aug. 20, 2012

(86) PCT No.: PCT/JP2012/071004
§ 371 (c)(1),
(2), (4) Date: Aug. 11, 2015

(87) PCT Pub. No.: WO2013/027702
PCT Pub. Date: Feb. 28, 2013

(65) Prior Publication Data
US 2016/0175953 A1    Jun. 23, 2016

(30) Foreign Application Priority Data

Aug. 22, 2011   (JP) ................ 2011-180677

(51) Int. Cl.
*B23D 57/00* (2006.01)
*B24B 41/00* (2006.01)
(Continued)

(52) U.S. Cl.
CPC ..... *B23D 57/0046* (2013.01); *B23D 57/0007* (2013.01); *B24B 27/0633* (2013.01); *B24B 41/005* (2013.01); *B24B 41/067* (2013.01)

(58) Field of Classification Search
CPC ............ B23D 57/0046; B23D 57/0007; B24B 27/0633; B24B 27/005; B24B 27/067
(Continued)

(56) References Cited

U.S. PATENT DOCUMENTS 4,458,568 A * 7/1984 Cillario ................. A21C 15/04
83/54
5,878,737 A   3/1999 Hodsden
(Continued)

FOREIGN PATENT DOCUMENTS

CN     101678563 A    3/2010
CN     201552489 U    8/2010
(Continued)

OTHER PUBLICATIONS

International Search Report pertaining to International Application No. PCT/JP2012/071004.
(Continued)

*Primary Examiner* — Omar Flores Sanchez
(74) *Attorney, Agent, or Firm* — Marsh Fischmann & Breyfogle LLP (57) ABSTRACT

A wire (12) is wound around multiple processing rollers (11) several times. A holding mechanism (13) and a depressing mechanism (25) are provided above an area where the wire (12) is wound. The holding mechanism (13) holds a workpiece (W) elastically and laterally. The depressing mechanism (25) depresses the workpiece (W) held by the holding mechanism (13) toward the wire (12).

5 Claims, 6 Drawing Sheets

(51) Int. Cl.
*B24B 27/06* (2006.01)
*B24B 41/06* (2012.01)

(58) Field of Classification Search
USPC .......................................................... 83/651.1
See application file for complete search history.

(56) References Cited

U.S. PATENT DOCUMENTS

| | | | |
|---|---|---|---|
| 5,964,210 A | 10/1999 | Hodsden | |
| 6,024,080 A | 2/2000 | Hodsden | |
| 6,135,103 A * | 10/2000 | Katamachi | B23D 57/0046 125/16.02 |
| 6,279,564 B1 | 8/2001 | Hodsden et al. | |
| 6,408,840 B2 * | 6/2002 | Ishida | 125/16.01 |
| 2004/0159316 A1 | 8/2004 | Muller et al. | |
| 2007/0131213 A1 * | 6/2007 | Matsuda | B28D 5/0082 125/21 |
| 2010/0126488 A1 * | 5/2010 | Bakshi | B24B 27/0633 125/16.02 |
| 2010/0163010 A1 | 7/2010 | Kitagawa | |
| 2012/0178346 A1 | 7/2012 | Wiesner et al. | |

FOREIGN PATENT DOCUMENTS

| | | |
|---|---|---|
| EP | 0745447 A1 | 12/1996 |
| JP | 07-304030 | 11/1995 |
| JP | 2000-271848 | 10/2000 |
| JP | 2001-510742 | 8/2001 |
| JP | 2002-120139 | 4/2002 |
| JP | 2004-216549 | 8/2004 |
| JP | 2006-150505 A | 6/2006 |
| JP | 2010-253612 A | 11/2010 |
| JP | 2012-139782 | 7/2012 |
| JP | 2012-143863 | 8/2012 |
| WO | 99/02295 A2 | 1/1999 |

OTHER PUBLICATIONS

Office Action received from Chinese Patent Office in relation to Chinese Application No. 201280012682.7 (dated Apr. 30, 2014).
Office Action received from Korean Patent Office in relation to Korean Application No. 10-2014-7007219 (dated Jun. 16, 2014).

* cited by examiner

WIRE SAW

FIELD OF THE INVENTION

The present invention relates to a wire saw for cutting a workpiece made of a brittle material such as a semiconductor material, a magnetic material or ceramic with a wire.

BACKGROUND OF THE INVENTION

Patent Document 1 discloses a wire saw of this type. The wire saw disclosed in this document includes multiple processing rollers and a wire. The wire is wound around the processing rollers several times. An up-and-down mechanism is arranged above an area where the wire is wound. A workpiece is attached to and detached from the up-and-down mechanism through a carbon plate and an attachment plate. The workpiece is fixed to the carbon plate and the attachment plate with an adhesive. The rotation of the processing rollers makes the wire travel around the processing rollers. Meanwhile, a processing liquid containing abrasive grains is supplied to the wire. If the up-and-down mechanism moves down while the wire saw is in this condition, the workpiece is pressed against the wire to cut the workpiece.

The conventional wire saw necessitates attachment of a workpiece to the carbon plate and the attachment plate with an adhesive before cutting of the workpiece. Additionally, after the cutting of the workpiece, the cut workpiece should be detached from the carbon plate and the attachment plate. Hence, a task to be done before and after the cutting becomes burdensome, causing the problem of reduction of processing efficiency and increase of manufacturing cost.

PRIOR ART DOCUMENTS

Patent Documents
 Patent Document 1: Japanese Laid-Open Patent Publication No. 2002-120139

DISCLOSURE OF THE INVENTION

The object of the present invention is to provide a wire saw that makes a task unnecessary relating to adhesive attachment and detachment of a workpiece to be done before and after cutting.

In order to achieve the aforementioned object, a first aspect of the present invention provides a wire saw with multiple processing rollers and a wire wound around the processing rollers several times. The wire saw comprises: holding means to hold a workpiece elastically and laterally above an area where the wire is wound; and depressing means to depress the workpiece held by the holding means toward the wire.

In this structure, the workpiece is held elastically and laterally by the holding means above the area where the wire is wound. Then, the workpiece held by the holding means is depressed toward the wire by the depressing means. Unlike the conventional structure, this structure makes a task unnecessary relating to adhesive attachment of the workpiece with an adhesive to a carbon plate and an attachment plate to be done before cutting of the workpiece, or detachment of the workpiece from the carbon plate and the attachment plate to be done after cutting of the workpiece. Further, workpieces can be fed continuously onto the wire. This enhances efficiency in processing the workpieces, thereby reducing manufacturing cost.

In the aforementioned wire saw, it is preferable that the holding means includes a receiving member to receive a side surface of the workpiece and a pressing member to press the workpiece against the receiving member using spring force.

The side surface of the workpiece includes not only a side surface extending in the lengthwise direction of the workpiece but also an end surface positioned at an edge of the workpiece as viewed in the lengthwise direction thereof.

It is preferable that the aforementioned wire saw comprise auxiliary holding means to hold the workpiece elastically and laterally below the area where the wire is wound.

In the aforementioned wire saw, it is preferable that the auxiliary holding means includes a receiving member to receive a side surface of the workpiece and a pressing member to press the workpiece against the receiving member using spring force.

In the aforementioned wire saw, it is preferable that a roller is provided below the area between the processing rollers where the wire is wound, the roller rotate about an axis line parallel to an axis line of the processing rollers, the shortest distance between an outer circumferential surface of the rotary roller and the wire be set to be longer than the radius of the workpiece and shorter than the diameter of the workpiece, and the workpiece cut by the wire come into contact under pressure with the outer circumferential surface of the roller.

It is preferable that the aforementioned wire saw comprises driving means to rotate the roller.

DETAILED DESCRIPTION OF THE PREFERRED EMBODIMENTS

First Embodiment

A first embodiment embodying a wire saw of the present invention is described below by referring to FIGS. 1 and 2.

Figure 1:
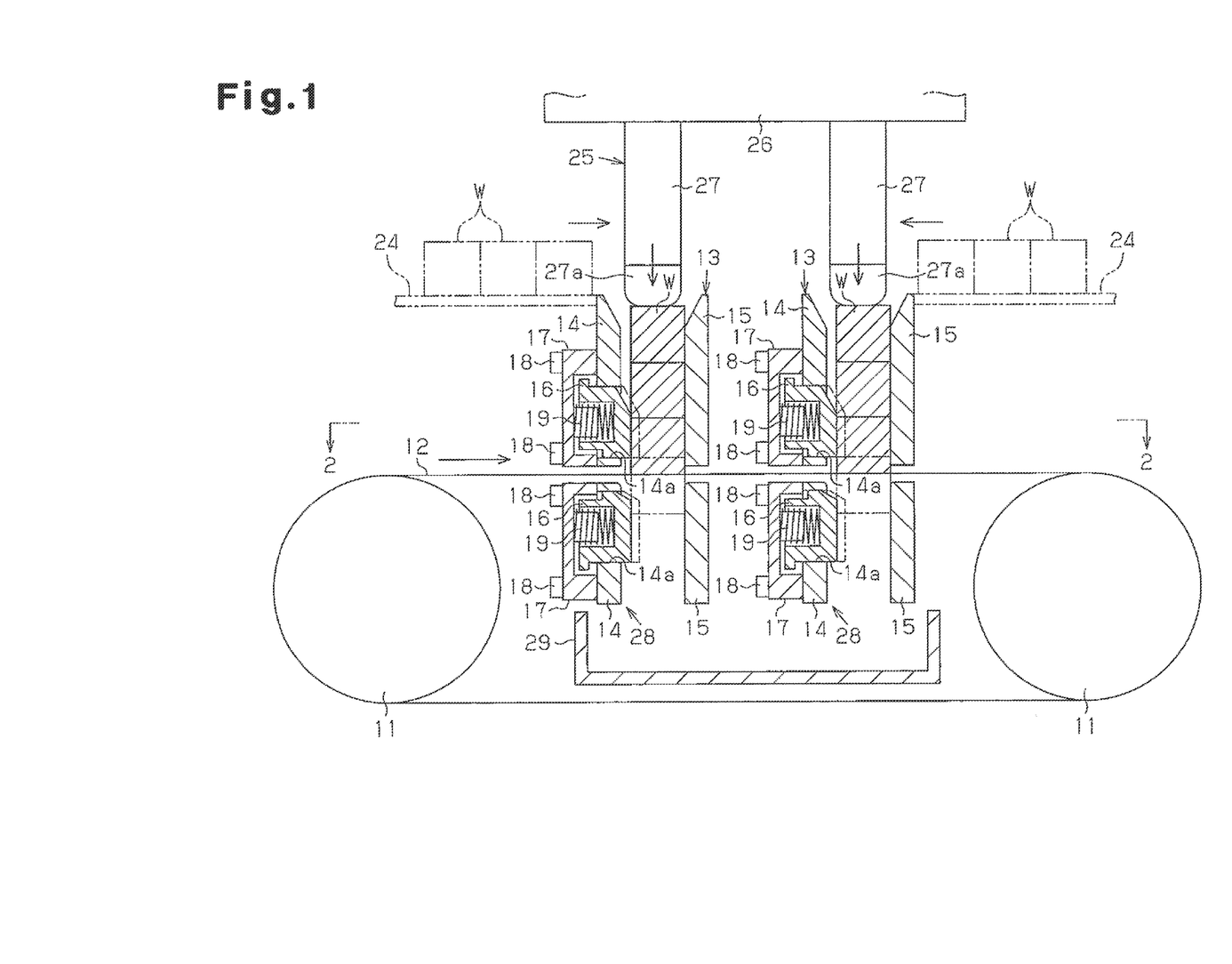
FIG. 1 is a sectional view showing a wire saw of a first embodiment of the present invention.
Figure 2:
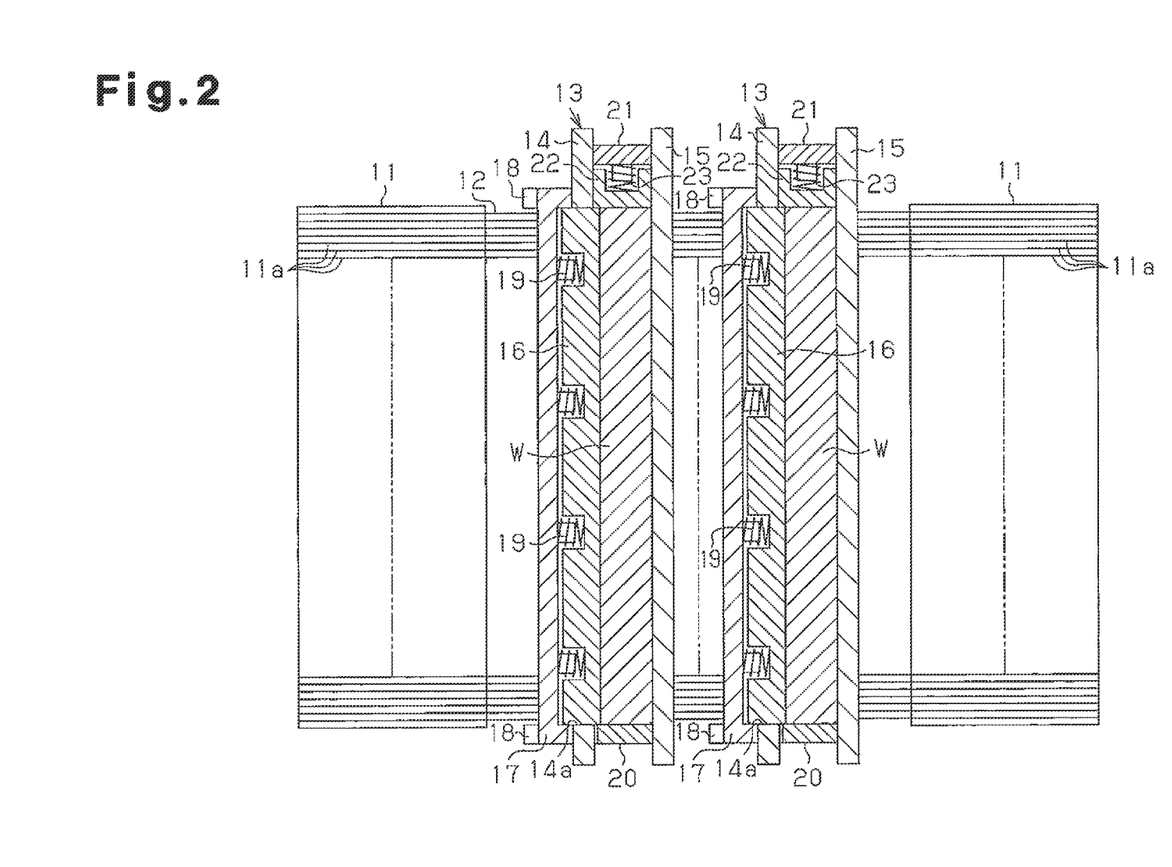
FIG. 2 is a sectional view taken along line 2-2 of FIG. 1.

As shown in FIGS. 1 and 2, the wire saw includes a frame not shown in the drawings and processing rollers 11 in a pair. Each processing roller 11 is rotationally supported on the frame. Multiple annular grooves 11a are formed at a given pitch in the outer circumferential surface of each processing roller 11. The wire 12 is arranged along the annular grooves 11a. The wire 12 is wound around the processing rollers 11 several times.

Holding mechanisms 13 in a pair are arranged as holding means above an area between the processing rollers 11 where the wire 12 is wound. The holding mechanisms 13 elastically hold a workpiece W laterally. The workpiece W is a rectangular column having a rectangular shape in cross section. A workpiece W may also be a circular column, for example. Each holding mechanism 13 includes a guide plate 14 and a guide plate 15 in a pair extending in the axis line of the processing rollers 11. The guide plates 14 and 15 are spaced laterally. A support hole 14a is formed in the guide plate 14. A holding member 16 is inserted as a pressing member in the support hole 14a. The holding member 16 is supported such that it can get closer to and farther from the guide plate 15 as a receiving member. A retaining plate 17 is attached with multiple screws 18 to a side surface of the guide plate 14. The retaining plate 17 retains the holding member 16 such that the holding member 16 does not come off the support hole 14a. Multiple springs 19 are interposed between the holding member 16 and the retaining plate 17. The springs 19 bias the holding member 16 against the guide plate 15.

As shown in FIG. 2, a regulating plate 20 is arranged as a receiving member between respective first end portions of the guide plates 14 and 15. A support plate 21 is arranged between respective second end portions of the guide plates 14 and 15. A positioning member 22 is arranged as a pressing member inside the support plate 21. The positioning member 22 can get closer to and farther from the regulating plate 20. A spring 23 is interposed between the positioning member 22 and the support plate 21. The spring 23 biases the positioning member 22 against the regulating plate 20.

As shown in FIG. 1, feeding mechanisms 24 in a pair are arranged above corresponding holding mechanisms 13. Each feeding mechanism 24 is arranged externally to a corresponding holding mechanism 13. The feeding mechanism 24 feeds multiple workpieces W one by one from above in between the guide plates 14 and 15. The workpieces W fed in between the guide plates 14 and 15 are elastically and laterally held by the holding member 16 and the guide plate 15. At this time, as shown in FIG. 2, opposite end portions of the workpiece W as viewed in the lengthwise direction thereof are held by the positioning member 22 and the regulating plate 20. This determines the position of the workpiece W as viewed in the axis direction of the processing rollers 11.

A depressing mechanism 25 is arranged as depressing means above the holding mechanisms 13. The depressing mechanism 25 depresses a workpiece W held by each holding mechanism 13 toward the wire 12. The depressing mechanism 25 includes an up-and-down body 26 and depressing members 27 in a pair provided on the lower surface of the up-and-down body 26. The up-and-down body 26 is supported above the frame such that it can move up and down. Depressing strips 27a made of synthetic resin are attached to the respective lower ends of the depressing members 27. The depressing strips 27a are attached to and detached from the respective lower ends of the depressing members 27. The up-and-down body 26 and the depressing members 27 move down together while the wire 12 travels between the processing rollers 11. This depresses the workpiece W toward the wire 12, thereby cutting the workpiece W.

Auxiliary holding mechanisms 28 in a pair are arranged as auxiliary holding means below the area between the processing rollers 11 where the wire 12 is wound. The auxiliary holding mechanisms 28 in a pair are arranged to be responsive to corresponding holding mechanisms 13. Like the holding mechanisms 13, the auxiliary holding mechanisms 28 each include a guide plate 14, a guide plate 15, a holding member 16, a retaining plate 17, a spring 19, and the like. A workpiece W sliced by the wire 12 is held by the guide plate 15 and the holding member 16 and is then released from the holding by the guide plate 15 and the holding member 16. The holding member 16 of the auxiliary holding mechanism 28 functions as a pressing member and the guide plate 15 of the auxiliary holding mechanism 28 functions as a receiving member.

A chute 29 for product ejection is arranged below the auxiliary holding mechanisms 28. After released from holding by the guide plates 15 and the holding members 16, a cut workpiece W falls from between the holding members 16 and the guide plates 15 and are then ejected to the outside through the chute 29.

The action of the aforementioned wire saw is described next.

As shown in FIG. 1, while the wire saw operates, multiple workpieces W are fed by the feeding mechanisms 24 in between the guide plates 14 and the guide plates 15. Next, the workpieces W are depressed by the depressing members 27 to be placed between the holding members 16 and the guide plates 15. Then, the workpieces W are held by the holding members 16 and the guide plates 15 elastically and laterally. In doing so, opposite end portions of each workpiece W as viewed in the lengthwise direction thereof are elastically held by the positioning member 22 and the regulating plate 20, as shown in FIG. 2. This determines the position of each workpiece W as viewed in the direction of the axis line of the processing rollers 11.

In this condition, the processing rollers 11 rotate to make the wire 12 start to travel between the processing rollers 11. Then, a processing liquid is supplied onto the wire 12 from a nozzle not shown in the drawings. Next, the up-and-down body 26 moves the depressing members 27 down. This depresses the workpieces W held by the holding members 16 and the guide plates 15 toward the wire 12, thereby cutting the workpieces W. The cut workpieces W are released from the holding by the holding members 16 and the guide plates 15 of the holding mechanisms 13. Next, while being held by the holding members 16 and the guide plates 15 of the auxiliary holding mechanisms 28, the workpieces W fall onto the chute 29. Then, the workpieces W are ejected to the outside through the chute 29.

Thus, the first embodiment can achieve the following effects.

(1) A workpiece W is held elastically and laterally by the holding mechanisms 13 above the area where the wire 12 is wound. Then, the workpiece W held by the holding mechanisms 13 is depressed toward the wire 12 by the depressing mechanism 25. Unlike the conventional structure, this structure makes a task unnecessary relating to adhesive attachment of the workpiece W with an adhesive to a carbon plate and an attachment plate to be done before cutting of the workpiece W, or detachment of the workpiece W from the carbon plate and the attachment plate to be done after cutting of the workpiece W. Further, feeding multiple workpieces W sequentially onto the wire 12 can cut the workpieces W continuously. This enhances efficiency in processing the workpieces W, thereby reducing manufacturing cost.

(2) A sliced workpiece W is elastically held by the auxiliary holding mechanisms 28 below the area where the wire 12 is wound. This can prevent unstable behavior of the sliced workpiece W, so that damage on the workpiece W can be avoided before it happens.

Second Embodiment

A second embodiment embodying the wire saw of the present invention is described below. The following mainly describes a difference from the first embodiment.

Figure 3:
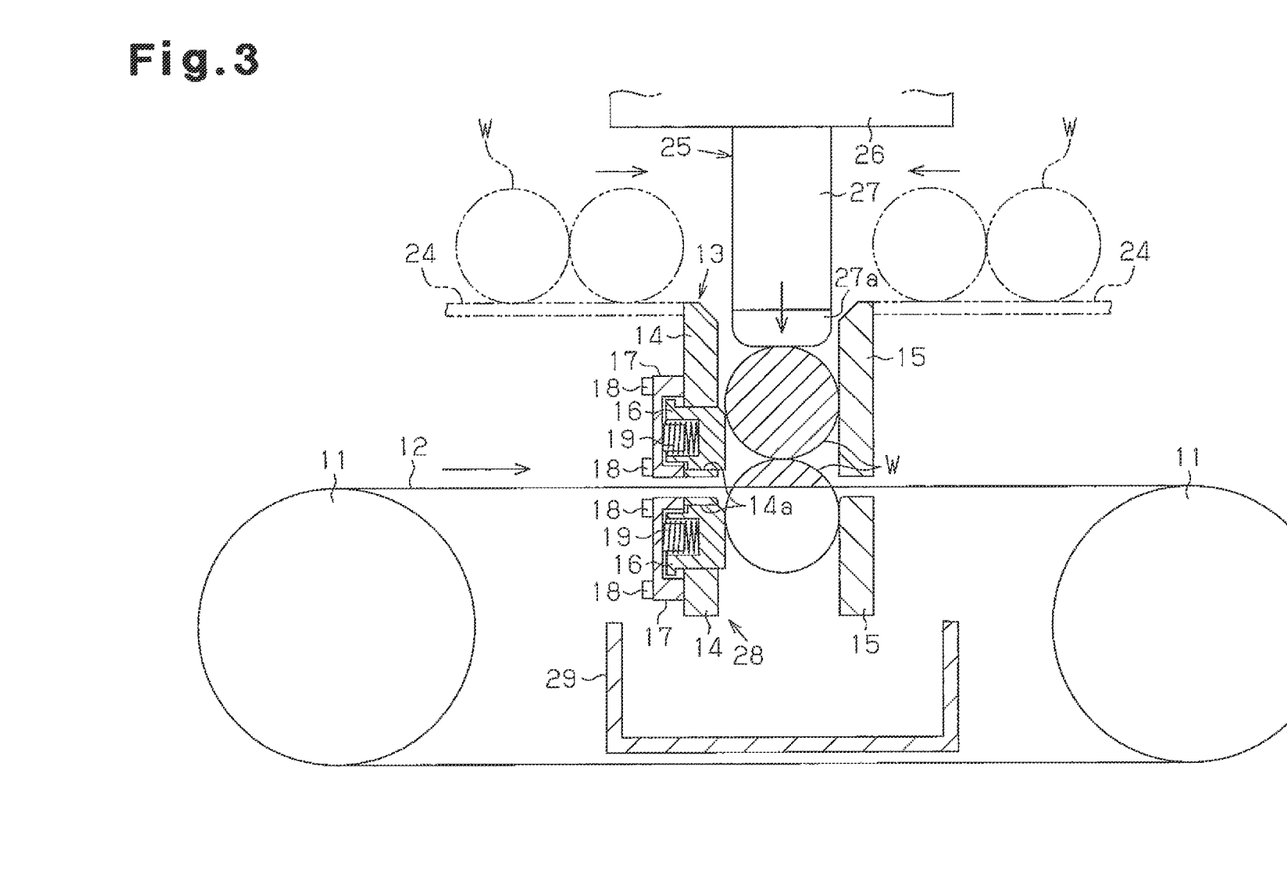
FIG. 3 is a sectional view showing a wire saw of a second embodiment of the present invention.

As shown in FIG. 3, one holding mechanism 13 of the same structure as that of the first embodiment is arranged above the area between the processing rollers 11 where the wire 12 is wound. One auxiliary holding mechanism 28 of the same structure as that of the first embodiment is arranged below the area between the processing rollers 11 where the wire 12 is wound. The depressing mechanism 25 includes one depressing member 27 to be responsive to the holding mechanism 13. In the second embodiment, a workpiece W having a circular shape in cross section is first fed into the holding mechanism 13 by the feeding mechanism 24. Next, the workpiece W held by the holding mechanism 13 is depressed toward the wire 12 by the depressing member 27 of the depressing mechanism 25, thereby cutting the workpiece W.

Thus, the second embodiment can achieve substantially the same effects as those of the first embodiment described in (1) and (2).

Third Embodiment

A third embodiment embodying the wire saw of the present invention is described below. The following mainly describes a difference from the first embodiment.

Figure 4:
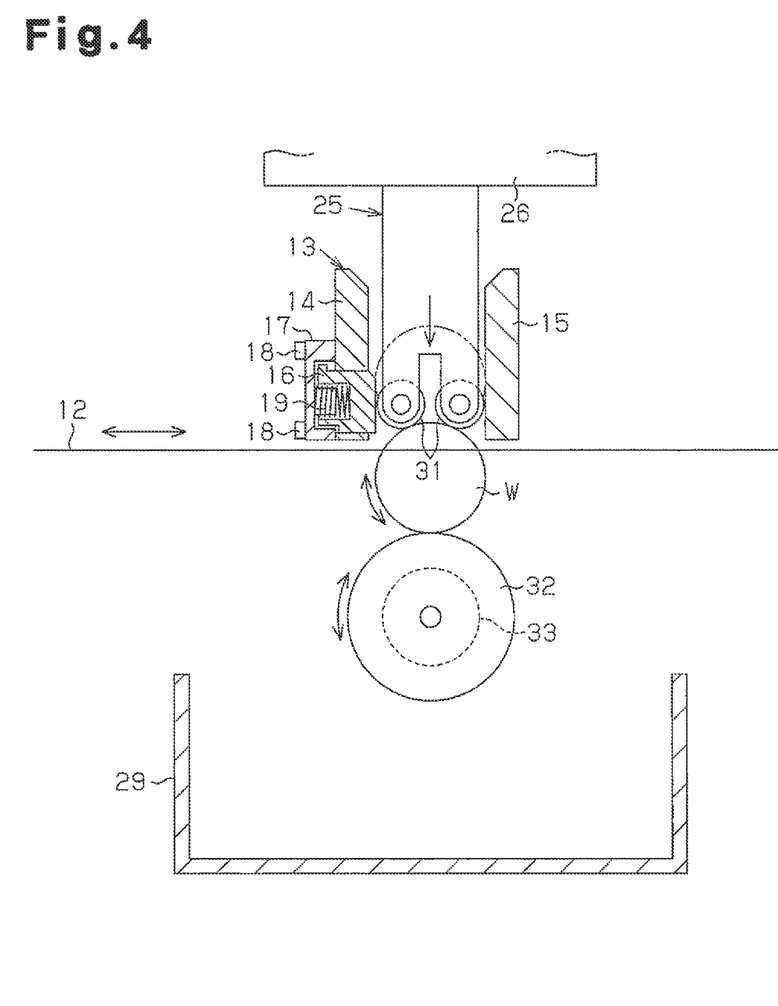
FIG. 4 is a sectional view showing a wire saw of a third embodiment of the present invention.

As shown in FIG. 4, one holding mechanism 13 of the same structure as that of the first embodiment is arranged above the area between the processing rollers 11 where the wire 12 is wound. In the third embodiment, instead of the depressing members 27 of the depressing mechanism 25 of the first embodiment, depressing rollers 31 in a pair are arranged below the up-and-down body 26. The depressing rollers 31 rotate about an axis line parallel to the axis line of the processing rollers 11. In the third embodiment, a workpiece W having a circular shape in cross section comes into contact with the depressing rollers 31 while receiving pressure applied from above by the depressing rollers 31 to be depressed toward the wire 12.

Instead of the auxiliary holding mechanisms 28 of the first embodiment, a rotary roller 32 is arranged below the area where the wire 12 is wound to be responsive to the holding mechanism 13. The rotary roller 32 rotates about an axis line parallel to the axis line of the processing rollers 11. A motor 33 is connected as driving means to the rotary roller 32. The rotary roller 32 is rotated by the motor 33. A workpiece W cut by the wire 12 comes into contact under pressure with the outer circumferential surface of the rotary roller 32. Then, the workpiece W rotates in response to the rotation of the rotary roller 32. The shortest distance between the outer circumferential surface of the rotary roller 32 and the wire 12 is set to be longer than the radius of the workpiece W and shorter than the diameter of the workpiece W.

In the third embodiment, a workpiece W having a circular shape in cross section is depressed by the depressing rollers 31 while being held by the holding mechanism 13. In this condition, the workpiece W is cut by the wire 12. When the workpiece W goes out of an area where the workpiece W is held by the holding mechanism 13, the workpiece W is released from the holding by the holding mechanism 13. Then, the workpiece W rotates in response to the travel of the wire 12. When the workpiece W comes into contact under pressure thereafter with the outer circumferential surface of the rotary roller 32, the workpiece W receives rotative force resulting from the rotation of the rotary roller 32. If the roller 32 rotates in a direction same as a direction of the rotation of the workpiece W rotating in response to the travel of the wire 12 (clockwise direction of FIG. 4), the rotation of the workpiece W is decelerated by the roller 32. This reduces the amount of cut of the workpiece W per unit time, thereby enhancing cutting accuracy. Meanwhile, if the roller 32 rotates in a direction opposite the direction of the rotation of the workpiece W rotating in response to the travel of the wire 12 (anticlockwise direction of FIG. 4), the rotation of the workpiece W is accelerated by the roller 32. This increases the amount of cut of the workpiece W per unit time, thereby enhancing cutting efficiency.

Thus, the third embodiment can achieve the following effects in addition to the effect of the first embodiment described in (1).

(3) The roller 32 to be rotated by the motor 33 is arranged below the area between the processing rollers 11 where the wire 12 is wound. The roller 32 rotates about the axis line parallel to the axis line of the processing rollers 11. A workpiece W of a circular column is cut by the wire 12 and then comes into contact under pressure with the outer circumferential surface of the roller 32. The shortest distance between the outer circumferential surface of the rotary roller 32 and the wire 12 is set to be longer than the radius of the workpiece W and shorter than the diameter of the workpiece W. This applies rotative force resulting from the rotation of the rotary roller 32 to the workpiece W when the workpiece W comes into contact under pressure with the rotary roller 32 while being cut by the wire 12. Thus, for cutting the workpiece W entirely, the workpiece W is not required to be depressed to a position exceeding the area where the wire 12 is wound. This enhances efficiency in processing the workpiece W.

(4) Selecting the direction of the rotation of the motor 33 can determine which one of cutting efficiency and cutting accuracy is to be given a higher priority.

Fourth Embodiment

A fourth embodiment embodying the wire saw of the present invention is described below. The following mainly describes a difference from the first embodiment.

Figure 5:
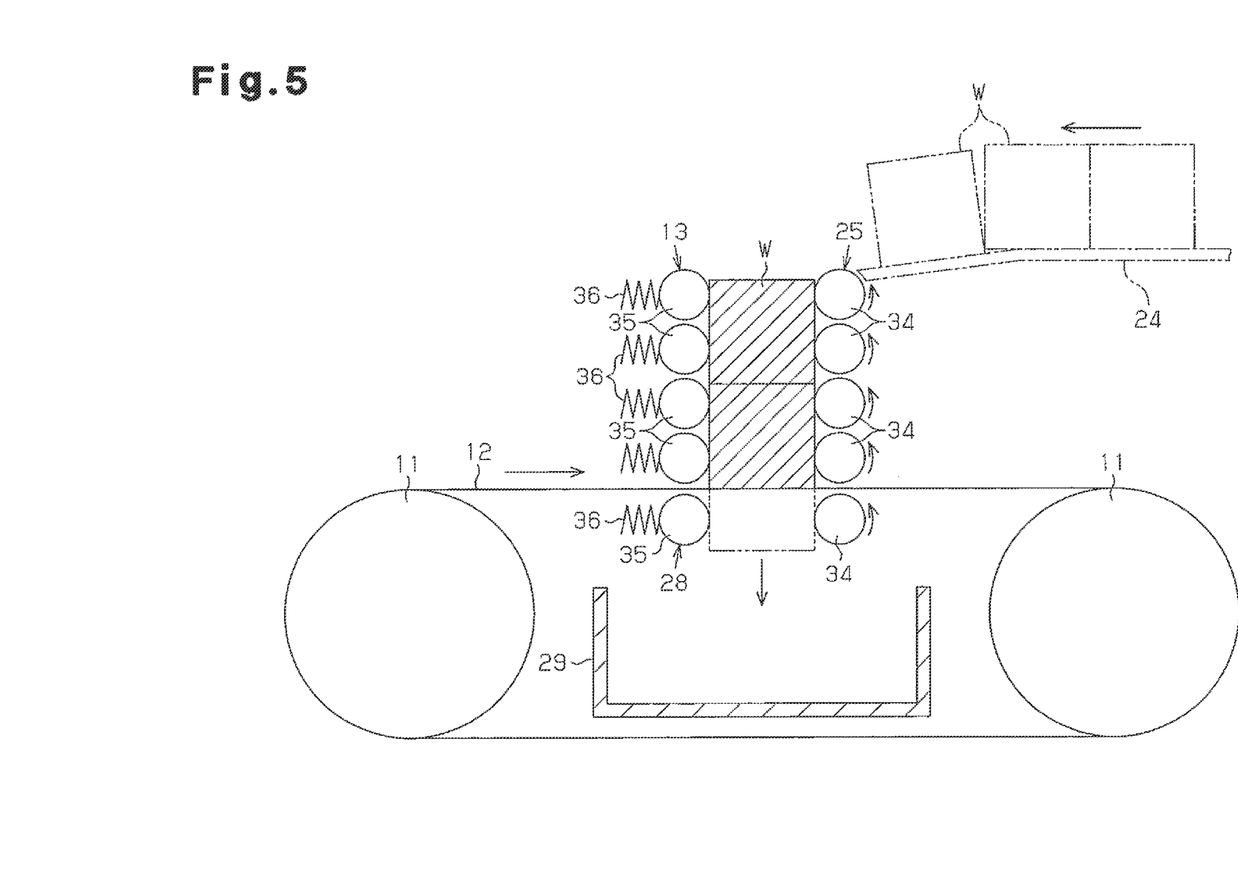
FIG. 5 is a sectional view showing a wire saw of a fourth embodiment of the present invention.

As shown in FIG. 5, the holding mechanism 13 includes multiple groups each composed of a first holding roller 34, a second holding roller 35, and a spring 36. The groups, each composed of the first and second holding rollers 34 and 35 and the spring 36, are arranged above the area where the wire 12 is wound to be vertically spaced apart from each other. The first holding rollers 34 are each rotationally arranged in a first position as viewed in a direction of the travel of the wire 12. The second holding rollers 35 are each arranged upstream of the direction of the travel of the wire 12 with respect to the first position. Both the first holding rollers 34 and the second holding rollers 35 can rotate. The second holding rollers 35 are arranged such that they can get closer to and farther from the first holding rollers 34. Each spring 36 biases a corresponding second holding roller 35 against a corresponding first holding roller 34.

A motor not shown in the drawings rotates all the first holding rollers 34 anticlockwise as viewed in FIG. 5 in a synchronized manner. The motor and all the first holding rollers 34 form the depressing mechanism 25 to depress a workpiece W toward the wire 12. The auxiliary holding mechanism 28 is arranged below the area where the wire 12 is wound. The auxiliary holding mechanism 28 is composed of one group of the same structure as that of the groups of the holding mechanism 13: the first holding roller 34, the second holding roller 35, and the spring 36.

In the fourth embodiment, a workpiece W having a rectangular shape in cross section is held between the first holding rollers 34 and the second holding rollers 35 of the holding mechanism 13. The workpiece W in this condition is depressed toward the wire 12 by the rotation of the first holding rollers 34, thereby cutting the workpiece W.

Thus, the fourth embodiment can achieve substantially the same effect as that of the first embodiment described in (1) and substantially the same effect as that of the third embodiment described in (3).

Each of the aforementioned embodiments can be changed as follows.

In each of the embodiments, the structure of the holding mechanism 13 and that of the depressing mechanism 25 can be changed. As an example, the auxiliary holding mechanism 28 can be omitted.

In the third embodiment, the motor 33 may rotate at variable speed.

In the third embodiment, the rotary roller 32 may rotate freely. In this case, a workpiece W rotates in response to the travel of the wire 12.

Figure 6:
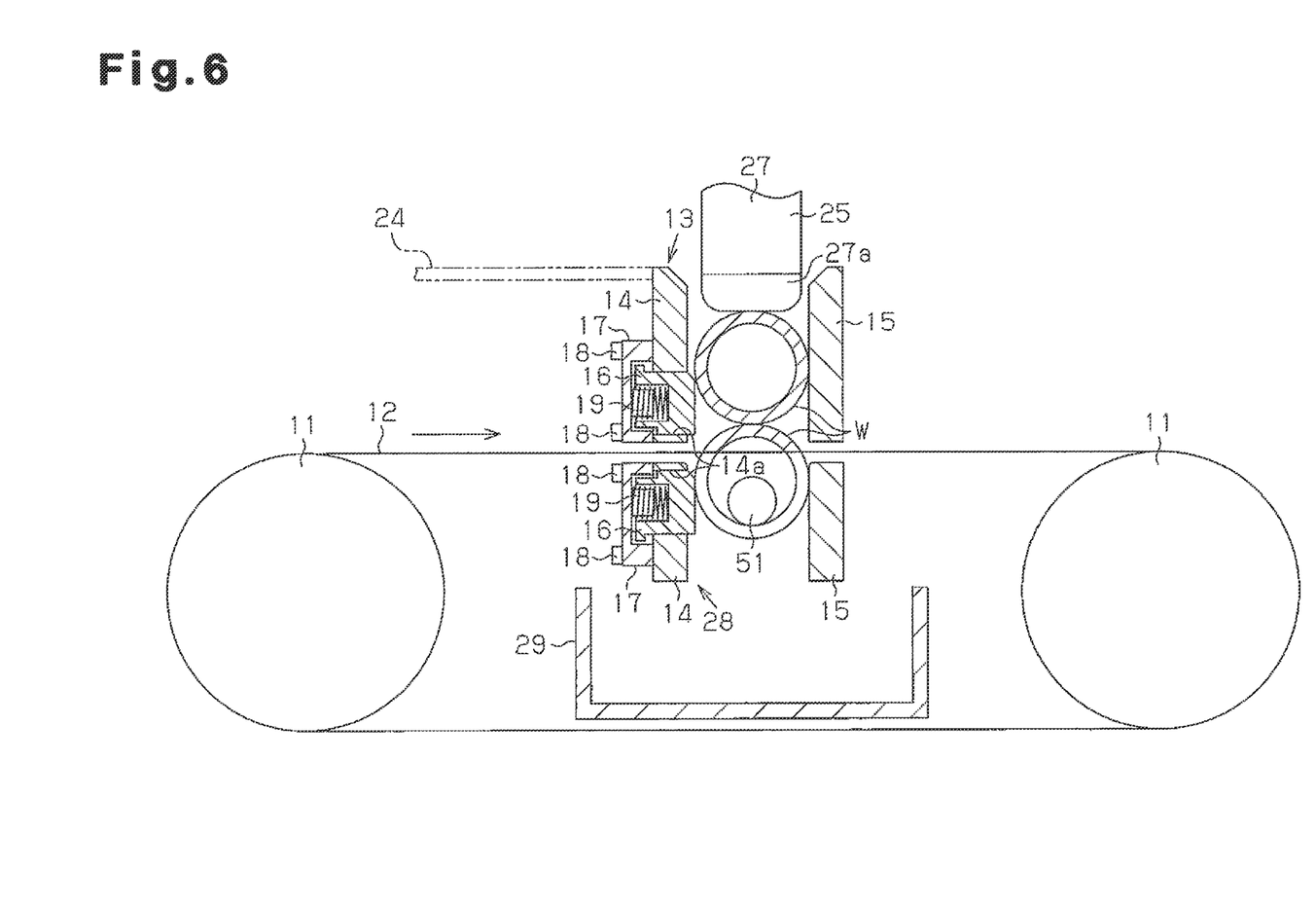
FIG. 6 is a sectional view showing a wire saw of a modification.

As shown in FIG. 6, if a workpiece W has a tubular shape, a lower depressing member 51 to be inserted into the workpiece W may be provided below the wire 12. Specifically, if the workpiece W moves to a position below the wire 12, the lower depressing member 51 is inserted into the workpiece W from a retracted position lateral to the workpiece W. Then, the lower depressing member 51 moves down until cutting of the workpiece W is finished to depress the workpiece W. In this structure, the upper depressing member 27 can move down until just before it contacts the wire 12. In this case, the lower depressing member 51 forms the depressing mechanism 25.

In the first embodiment, the guide plates 15 of the auxiliary holding mechanisms 28 can move from the guide position shown in FIG. 1 toward a direction opposite the guide plates 14. Specifically, when cutting of all workpieces W is finished, the guide plates 15 may get farther from the guide plates 14. Then, the sliced workpieces W may be released from the auxiliary holding mechanisms 28 and may be made to fall onto the chute 29 eventually.

The invention claimed is:

1. A wire saw, the wire saw comprising:
   multiple processing rollers and a wire wound around the processing rollers more than once;
   a holding device to hold a workpiece elastically and laterally above an area where the wire is wound; and
   a depressing device to depress the workpiece held by the holding device toward the wire,
   wherein the holding device includes a receiving member to receive a side surface of the workpiece and a pressing member to press the workpiece against the receiving member using spring force.

2. The wire saw according to claim 1, further comprising an auxiliary holding device to hold the workpiece elastically and laterally between the processing rollers.

3. The wire saw according to claim 2, wherein the auxiliary holding device includes a receiving member to receive a side surface of the workpiece and a pressing member to press the workpiece against the receiving member using spring force.

4. The wire saw according to claim 1, wherein
   a roller is provided below the area where the wire is wound between the processing rollers,
   the roller rotates about an axis line parallel to an axis line of the processing rollers,
   the shortest distance between an outer circumferential surface of the rotary roller and the wire is set to be longer than the radius of the workpiece and shorter than the diameter of the workpiece, and
   the workpiece cut by the wire comes into contact under pressure with the outer circumferential surface of the roller.

5. The wire saw according to claim 4, further comprising a driving device to rotate the roller.

\* \* \* \* \*